United States Patent [19]

Shingu et al.

[11] Patent Number: 4,747,906
[45] Date of Patent: May 31, 1988

[54] PROCESS AND APPARATUS FOR PURIFYING SILICON

[75] Inventors: Hideo Shingu, Kyoto; Ryotatsu Otsuka, Sakai; Shigemi Tanimoto, Sakai; Kazuo Toyoda, Sakai, all of Japan

[73] Assignee: Showa Aluminum Corporation, Sakai, Japan

[21] Appl. No.: 77,921

[22] Filed: Jul. 27, 1987

[30] Foreign Application Priority Data

Aug. 7, 1986 [JP] Japan ................................ 61-186646

[51] Int. Cl.⁴ .......................................... C30B 19/00
[52] U.S. Cl. ........................... 156/624; 156/DIG. 64; 210/774

[58] Field of Search ............... 156/621, 624, DIG. 64, 156/616 R, 616 A; 23/295 R, 300, 301; 210/773, 774, 175; 427/93, 45.1, 82, 86; 423/324, 348; 422/248

[56] References Cited

U.S. PATENT DOCUMENTS 4,312,700  1/1982  Helmreich et al. ................. 422/248
4,417,911  11/1983  Cundy et al. ...................... 427/45.1

Primary Examiner—Frank Sever
Attorney, Agent, or Firm—Armstrong, Nikaido, Marmelstein & Kubovcik

[57] ABSTRACT

Crude silicon is purified by melting the crude silicon, maintaining the molten silicon above the solidification temperature thereof in an inert gas atmosphere, and rotating a hollow rotary cooling member as immersed in the molten silicon while introducing a cooling fluid into the cooling member to cause high-purity silicon to crystallize on the outer surface of the cooling member.

4 Claims, 3 Drawing Sheets

PROCESS AND APPARATUS FOR PURIFYING SILICON

BACKGROUND OF THE INVENTION

The present invention relates to a process for purifying silicon, and more particularly to a process utilizing the principle of segregation solidification for purifying metallic silicon for industrial uses, such as crude silicon having a purity of about 98 to about 99%, to obtain silicon having a high purity of at least 99.9%.

The percentages as used herein and in the appended claims are all by weight.

It is necessary to use silicon having a high purity of at least 99.9% as polycrystalline silicon for solar cells and also as polycrystalline silicon for preparing single-crystal silicon for semiconductors. Such high-purity silicon is prepared by purifying crude silicon for industrial uses having a purity of 98 to 99% and commercially available. Conventionally, chemical or metallurgical processes are thought useful for purifying such crude silicon. The chemical process generally comprises the steps of reacting crude silicon with hydrochloric acid to obtain trichlorosilane, purifying the trichlorosilane, reducing the purified silane with hydrogen and causing high-purity silicon to separate out on a red-hot rod of high-purity silicon. However, the conventional chemical purification process which includes many steps has the problem of being cumbersome to practice and costly. For metallurgical purification, the principle of segregation solidification is thought useful for crystallizing high-purity silicon from a melt of crude silicon in molten Sn-Pb alloy, Al alloy or Al. The conventional metallurgical purification process nevertheless requires a very long period of time for causing solidification in equilibrium, is low in productivity and has not been practiced on a commercial scale.

SUMMARY OF THE INVENTION

The main object of the present invention is to provide a process free of the above problems for purifying silicon.

The silicon purifying process of the present invention comprises melting crude silicon, maintaining the molten silicon above the solidification temperature thereof in an inert gas atmosphere, and rotating a hollow rotary cooling member as immersed in the molten silicon while introducing a cooling fluid into the cooling member to cause high-purity silicon to crystallize on the outer peripheral surface of the cooling member. The process of the invention purifies crude silicon to a higher purity by a simpler procedure than the conventional chemical purification process within a shorter period of time than the conventional metallurgical process for the reason to be described below. When crude silicon containing eutectic impurities which undergo a eutectic reaction with silicon is melted and then subjected to equilibrium solidification, primary crystal silicon of high purity first separates out. At this time, the ratio of the impurity concentration of the solid phase to the impurity concentration of the liquid phase, $C_S/C_L$, is expressed in terms of equilibrium segregation coefficient Ko. The equilibrium segregation coefficients of various impurities in silicon are already determined empirically. In the vicinity of the solid-liquid interface of the above system, a concentrated impurity layer having a higher impurity concentration than the other portion is formed by the released impurities. If solidification is then allowed to proceed very slowly over a prolonged period of time while diffusing the impurities in the concentrated layer through the entire liquid phase, the progress of solidification is also governed by the equilibrium segregation coefficient, that is, the solidification proceeds in equilibrium. However, the time-consuming operation is commercially infeasible in view of the productivity; the solidification must be effected within a shorter period of time. When expedited, the solidification of the liquid phase is governed by the effective segregation coefficient which is greater than the equilibrium segregation coefficient, with the result that the solid phase obtained has a higher impurity concentration than the one obtained by the above-mentioned mode of solidification governed by the equilibrium segregation coefficient. In the case where silicon is allowed to crystallize on the outer periphery of the rotary cooling member in rotation according to the invention, the impurities released in the vicinity of the solid-liquid interface can be diffused through and mixed with the entire liquid phase, thereby rapidly decreasing the thickness of the concentrated impurity layer in the liquid phase close to the interface during the progress of solidification of silicon. This decreases the segregation coefficient involved in the solidification to a value close to the equilibrium segregation coefficient, affording purified silicon within a short period of time with an exceedingly higher purity than the crude silicon.

With the process of the invention, the oxidation of molten silicon can be prevented. Molten silicon, when oxidized, forms on the surface of the melt an oxide film, which further grows to hinder the purification process and to result in waste of the crude silicon to be purified.

The above process is practiced by an apparatus which comprises a melting furnace having a heater, a crucible disposed within the melting furnace for containing molten silicon, means for holding the molten silicon in an inert gas atmosphere, a rotatable hollow cooling member disposed within the crucible, and means for supplying a cooling fluid to the interior of the hollow cooling member.

The present invention will be described below in greater detail.

DESCRIPTION OF THE PREFERRED EMBODIMENTS

Figure 1:
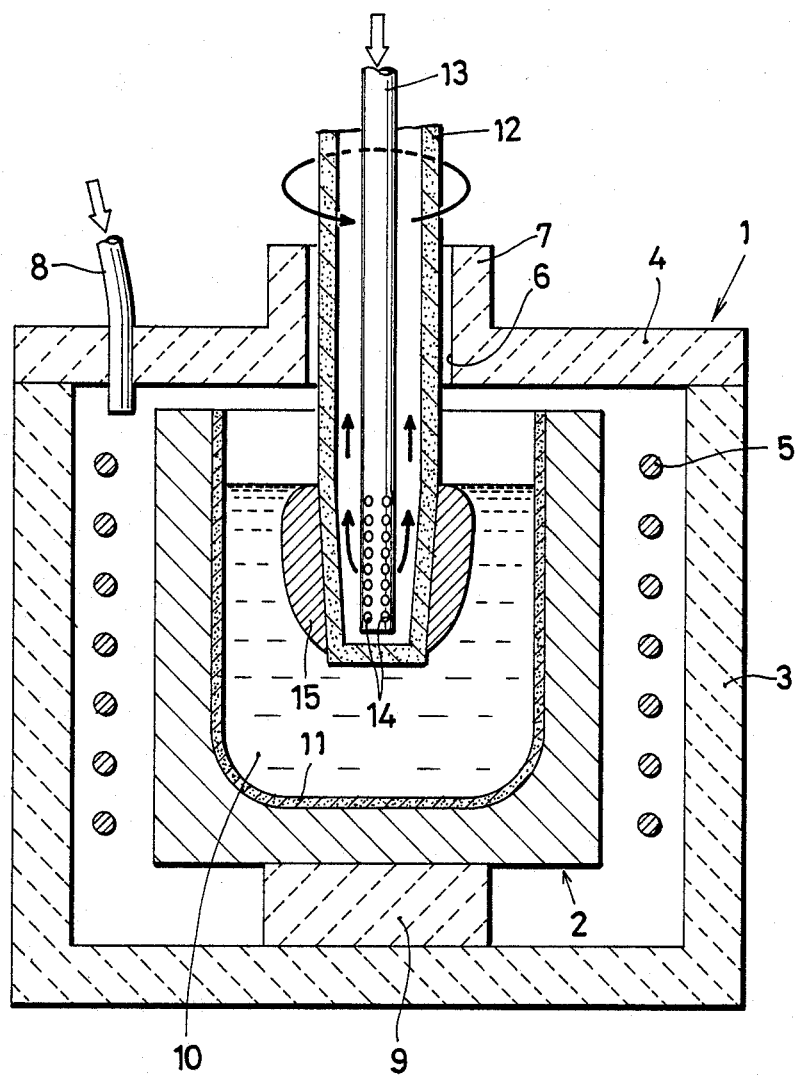
FIG. 1 is a view in vertical section showing a first embodiment of apparatus for practicing the process of the invention.
Figure 2:
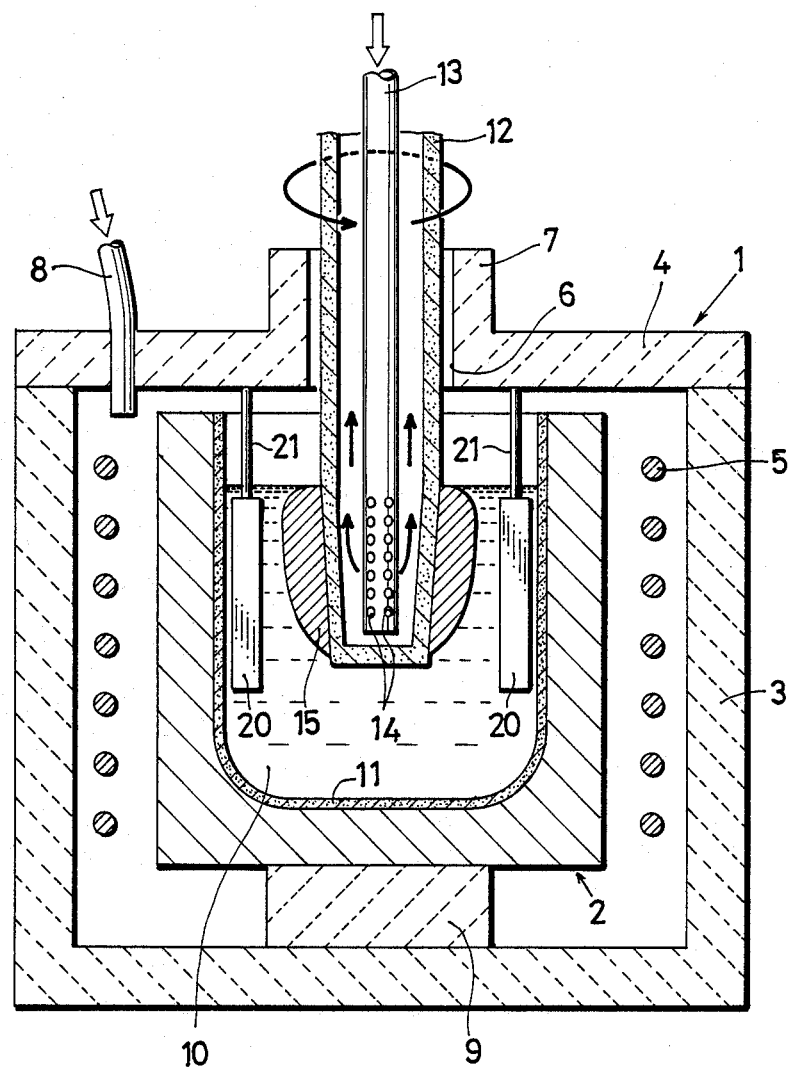
FIG. 2 is a view in vertical section showing a second embodiment of apparatus for practicing the process of the invention.
Figure 3:
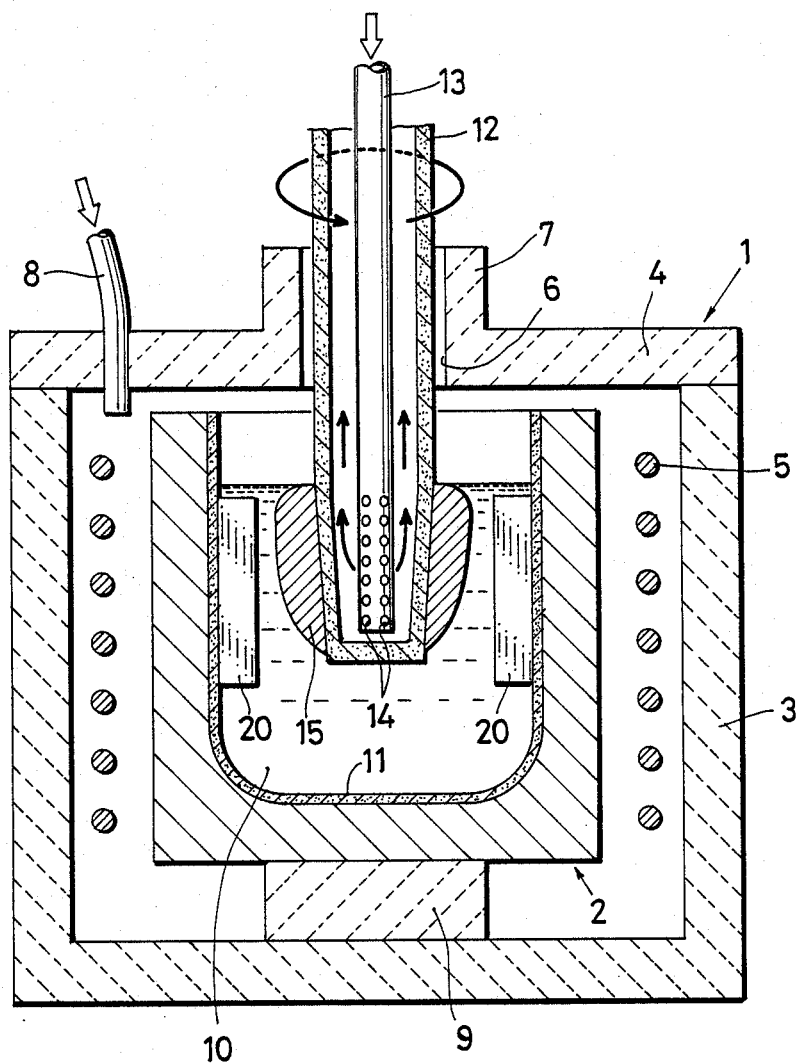
FIG. 3 is a view in vertical section showing a third embodiment of apparatus for practicing the process of the invention.

Throughout FIGS. 1 to 3, like parts and like substances are designated by like reference numerals.

FIG. 1 shows a first embodiment of apparatus for use in practicing the silicon purifying process of the present invention. With reference to this drawing, the silicon purifying apparatus has a melting furnace 1 and a crucible 2 disposed within the furnace 1. The melting furnace 1 comprises a main body 3 having an open upper end and a closure 4 removably closing the open upper end of the furnace main body 3. A heater 5 is provided along the inner surface of the peripheral wall of the main body 3. Preferably, the heater 5 mainly comprises graphite, silicon carbide or like ceramic material which is usable at high temperatures. The closure 4 is centrally formed with a bore 6. An upwardly projecting tubular member 7 is formed around the bore 6 on the upper side of the closure 4 integrally therewith. Extending through the closure 4 is a tube 8 for supplying an inert gas, which is preferably argon gas, to the interior of the furnace 1. The closure 4 and the gas supply tube 8 serve as means by which molten silicon in the crucible 2 is held in the atmosphere of the inert gas.

It is desired that the crucible 2 be made of a material, such as graphite or alumina, which will not react with silicon or pollute molten silicon. Preferably, the crucible 2 is used with a quartz glass crucible 11 of silicon dioxide fitted therein. The crucible 11 forms a silicon dioxide layer. The crucible 2 rests on a block of refractory brick 9 on the bottom of the furnace 1. The crude silicon to be purified is placed into the crucible 2 and heated into molten silicon 10 by the heater 5.

A hollow rotary cooling member 12 in the form of a vertical tube having a closed lower end extends downward through the tubular member 7 and the bore 6 into the melting furnace 1 and is immersed in the molten silicon 10 within the crucible 2. The cooling member 12 is free to move upward and downward. The cooling member 12 is tapered at the portion thereof immersed in the molten silicon 10. The hollow rotary cooling member 12 is internally provided with a pipe 13 for supplying a cooling fluid to the interior of the cooling member 12. A multiplicity of cooling fluid discharge holes 14 are formed in the peripheral wall of the fluid supply pipe 13 at the portion thereof positioned below the liquid level of the molten silicon 10. The cooling member 12 is preferably made of a material, such as silicon nitride or graphite, which will not pollute molten silicon by reacting therewith and which has high heat conductivity.

For the operation of the apparatus, the crude silicon to be purified is first placed into the crucible 2, and an inert gas is introduced into the melting furnace 1 via the gas supply tube 8 to provide an inert gas atmosphere in the interior of the furnace. The heater 5 is then energized to heat the crude silicon into molten silicon 10, which is maintained above the solidification temperature thereof by heating. The crude silicon may alternatively be melted before being placed into the crucible 2. The molten silicon 10 is held in the inert gas atmosphere. Subsequently, the cooling member 12 is rotated while supplying a cooling fluid to the interior of the member 12 via the fluid supply pipe 13. It is desirable to rotate the cooling member 12 at a peripheral speed of 500 to 6,000 mm/sec, more desirably 500 to 1,500 mm/sec. The impurities released into the liquid phase at the solid-liquid interface can be diffused into the entire liquid phase away from the interface by the rotation during the progress of solidification of the molten silicon. Consequently, solidification proceeds by being governed by a segregation coefficient close to the value of equilibrium segregation coefficient, causing high-purity silicon 15 to crystallize on the outer peripheral surface of the cooling member 12 within a short period of time. If the peripheral speed is below the lower limit, this effect will not be fully achieved, whereas speeds exceeding the upper limit are likely to present difficulty in depositing silicon on the outer periphery of the cooling member 12 upon solidification.

The high-purity silicon 15 separating out on the periphery of the cooling member 12 can be collected by mechanically scraping off the silicon 15 or remelting the silicon after lifting the cooling member 12 along with the closure 4.

With reference to FIG. 2 showing another apparatus as a second embodiment of the invention, two baffle plates 20 for reducing the speed of flow of molten silicon are suspended from the lower side of the closure 4 each by a suspender 21 in the form of a round rod. The second embodiment differs from the first only in this respect. Each baffle plate 20 has a lower end positioned below the lower end of the rotary cooling member 12 and an upper end positioned below the liquid level. The number of baffle plates 20 is not limited to two but can be at least one. Two to eight baffle plates are desirable. Such baffle plates 20 are arranged around the rotary cooling member 12 at a specified spacing circumferentially thereof.

The baffle plates 20 reduce the velocity of the flow of molten silicon 10 produced by the rotation of the rotary cooling member 12, increasing the speed of the rotary cooling member 12 relative to the liquid phase, namely, the difference between the peripheral speed of the cooling member 12 and the flow velocity of the molten silicon 10. When the difference increases, a concentrated impurity layer formed in the vicinity of the solid-liquid interface is mixed with the remaining liquid phase more effectively than when no baffle plate is provided, with the result that the impurities in the concentrated layer is diffused through the entire liquid phase, reducing the thickness of the concentrated layer and giving a greater temperature gradient to this portion. Moreover, the baffle plates 20 create turbulences of the molten silicon 10, which also decreases the thickness of the concentrated layer. Solidification proceeding in this state provides on the periphery of the cooling member 12 a mass of purified silicon 15 having an exceedingly higher purity than the crude silicon. The baffle plates 20, if projecting upward beyond the liquid level, would produce turbulences of molten silicon near the surface of the melt and render the melt surface wavy, consequently splashing the molten silicon, whereas such objections are avoidable since the upper ends of the baffle plates 20 are positioned below the liquid level. If the upper ends of the baffle plates 20 were positioned above the liquid level, portions of the molten silicon would solidify upon splashing over the upper inner surface of the crucible 11 or over the portions of the baffle plates 20 above the liquid level owing to turbulence or waving to result in a lower purification efficiency or lower productivity.

With reference to FIG. 3 showing another apparatus as a third embodiment of the invention, two baffle plates 20 for reducing the flow velocity of molten silicon are provided on the inner surface of the crucible 11 and spaced apart from each other by a specified distance circumferentially thereof. The third embodiment differs from the second only in this respect.

EXAMPLE 1

The apparatus shown in FIG. 1 was used.

Into the crucible 2 was placed 4 kg of solid crude silicon containing 0.50% of iron and 0.45% of aluminum, and argon gas was supplied to the melting furnace 1 via the gas supply tube 8 to replace the air in the furnace 1 by an argon gas atmosphere. Using the heater 5, the crude silicon was melted, and the molten silicon 10 was maintained at 1,500° C. Subsequently, the rotary cooling member 12 was rotated at 400 r.p.m., i.e. at a peripheral speed of 628 mm/sec, while introducing a cooling fluid into the member 12 through the fluid supply pipe 13. After operating the apparatus for 10 minutes, the cooling member 12 was stopped, giving 200 g of a silicon mass 15 around the cooling member 12. The silicon mass 15 removed from the cooling member 12 was found to contain 40 ppm of iron and 30 ppm of aluminum as impurities.

EXAMPLE 2

Crude silicon having the same composition as above was purified under the same conditions as in Example 1 with the exception of using the apparatus shown in FIG. 2. Consequently, 210 g of a silicon mass 15 crystallized on the outer periphery of the rotary cooling member 12. The silicon mass 15 removed from the cooling member 12 was found to contain 20 ppm of iron and 10 ppm of aluminum as impurities.

EXAMPLE 3

Crude silicon having the same composition as above was purified under the same conditions as in Example 1 with the exception of using the apparatus shown in FIG. 3. Consequently, 210 g of a silicon mass 15 crystallized on the outer periphery of the rotary cooling member 12. The silicon mass 15 removed from the cooling member 12 was found to contain 20 ppm of iron and 10 ppm of aluminum as impurities.

The present invention may be embodied differently without departing from the spirit and basic features of the invention. Accordingly, the embodiments herein disclosed are given for illustrative purposes only and are in no way limitative. It is to be understood that the scope of the invention is defined by the appended claims rather than by the specification and that all alterations and modifications within the definition and scope of the claims are included in the claims.

What is claimed is:

1. A process for purifying crude silicon comprising melting the crude silicon, maintaining the molten silicon above the solidification temperature thereof in an inert gas atmosphere, and providing a hollow rotary cooling member immersed in the molten silicon, rotating and introducing a cooling fluid into the cooling member to cause high-purity silicon to crystallize on the outer surface of the cooling member.

2. A process as defined in claim 1 wherein the cooling member is rotated at a peripheral speed of 500 to 6,000 mm/sec.

3. A process as defined in claim 1 wherein the cooling member is rotated at a peripheral speed of 500 to 1,500 mm/sec.

4. A process as defined in claim 1 wherein the inert gas is argon gas.

* * * * *